(No Model.)
B. NOLAN.
FRICTION CLUTCH.
No. 450,746. Patented Apr. 21, 1891.
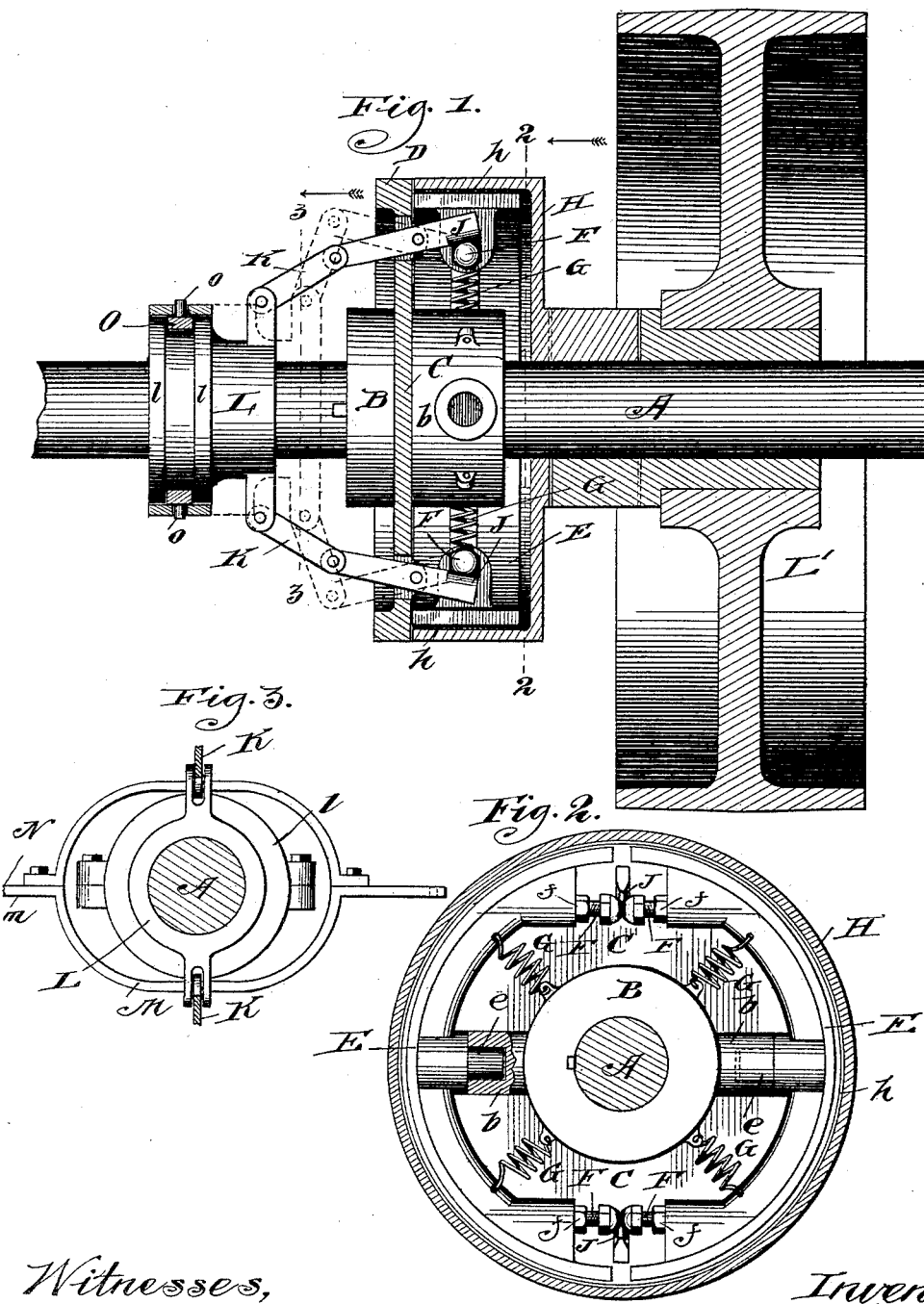
Witnesses,
S. T. Mann
F. C. Goodwin
Inventor,
Bernard Nolan
By Offield, Towle & Linthicum
Attys

UNITED STATES PATENT OFFICE.

BERNARD NOLAN, OF CHICAGO, ILLINOIS, ASSIGNOR TO THE McQUIRE MACHINERY COMPANY, OF SAME PLACE.

FRICTION-CLUTCH.

SPECIFICATION forming part of Letters Patent No. 450,746, dated April 21, 1891.

Application filed January 22, 1891. Serial No. 378,679. (No model.)

*To all whom it may concern:*

Be it known that I, BERNARD NOLAN, a citizen of the United States, residing at Chicago, Illinois, have invented certain new and useful Improvements in Friction-Clutches, of which the following is a specification.

My invention relates to certain improvements in friction-clutches, and has for its object to simplify the construction and increase the efficiency of such devices.

My improved clutch comprises in the preferred form of construction a clutch member having a hub keyed to the shaft, a web and rim cast integral with the hub, and a divided or two-part ring having a sliding spring-controlled connection with the hub, a second member loosely mounted on the shaft and having an overhanging flange surrounding the segmental ring, and pivoted wedges adapted to be forced between the ends of the ring-segments, whereby to force them into contact with the loose member.

In the accompanying drawings, Figure 1 is a sectional elevation. Fig. 2 is a sectional elevation on the line 2 2 of Fig. 1, looking in the direction of the arrow; and Fig. 3 is a similar view on the line 3 3.

In the drawings, A represents the line-shaft, upon which is keyed the hub B of the fixed clutch member. Said member has a web C and a flange D. The hub B has the peripheral socketed lugs b, in which slide the studs e of the segments E. These segments have the headed screw-bolts F, having the locking-nuts f. When out of clutch, the heads of these pairs of bolts are in contact, or substantially so. The withdrawal of the segments from engagement is effected by the springs G.

H represents the loose member of the clutch, which may be used as a driving-pulley. As shown, it has on its hub one member of a common clutch or gland, the fellow of which is carried by the pulley L'; but the pulley may be integral with the member H. The overlapping flange of this loose member may have an internal removable lining h of mineral fiber or other suitable material. These segments are forced into engagement with this friction-surface by means of the pivoted wedges J, which are operated by means of the links K, which are pivotally connected with the sliding sleeve L. The latter is moved along the shaft by means of a lever mechanism comprising in the form shown the strap M, one end m of said strap terminating in a lever N. (Shown broken away.) This strap is engaged by the pins o of a collar O, seated between the flanges l of the sleeve L, the latter being turned with the shaft.

In Fig. 1 the device is shown out of clutch by the full lines, while the dotted lines show the position of the toggles when the device is in clutch. To effect the clutching, the sleeve L is moved along the shaft by means of the lever. The links K are operated, forcing the wedges between the opposing heads of the bolts carried by the segments, and the latter are thus forced out into operative engagement with the loosely-mounted member, thus causing its rotation. The wedges enter with their thin edges between the rounded heads of the bolts connected with the segments, and hence the application of the segments is gradual, and the motion communicated to the driven pulley is correspondingly slow, thus avoiding all jar and shock.

It will be observed that the faces of the wedges are parallel toward their tops, and the opposing heads of the bolts have plane parallel faces with rounded edges. From this it results that when the parts are in operative position the perpendicular surfaces of the wedges, having been forced between the perpendicular surfaces of the bolt-heads, are effectually locked in that position, and so held until released by the withdrawal of the sleeve.

The number of the segments and wedges may be increased in the construction of large clutches and the details of construction may be varied.

I claim—

1. A clutch device comprising, in combination, a member having a hub keyed to the shaft, segments having a sliding connection with said hub, pivoted wedges and means for rocking them on their pivots whereby to spread the segments, and a loose member having a flange encircling the segments and adapted to be locked therewith by the operation of the wedges, substantially as described.

2. A clutch device comprising, in combination, a member keyed to the shaft, segments carried by and having a sliding connection with said fixed member, and springs to retract said segments after they have been moved, cam-surfaces carried by the segments, wedges pivoted to the fixed member, a loose member having a flange encircling the segments and adapted to be locked therewith by the operation of the wedges, a sliding sleeve bearing links pivotally connected with and adapted to operate the wedges, and means for moving the sleeve whereby to operate the wedges, substantially as described.

3. A clutch device comprising, in combination with a line-shaft, a member secured to rotate with the shaft and bearing pivoted wedges, segments having a sliding connection with said member, and springs to retract the segments, a member loosely mounted on the shaft and having a flange encircling the segments, a sliding sleeve having flanges to confine a loose ring and connected by links with the wedges, and a lever having an end thereof pivotally connected to a stationary part and pivotally connected between its ends to the loose ring, substantially as described.

4. In a friction-clutch, the combination, with the fixed and loose members, of segments having a sliding connection with the fixed member, headed bolts having a threaded connection with the ends of the segments, and pivoted wedges adapted to be forced between the heads of the bolts, substantially as described.

5. In a friction-clutch, the combination, with the fixed and loose members, of segments having a sliding connection with the fixed member, headed bolts having a threaded connection with the ends of the segments and provided with locking-nuts, and pivoted wedges adapted to be forced between the heads of the bolts, substantially as described.

6. In a friction-clutch, the combination, with the fixed and loose members, of segments having a sliding connection with the fixed member and carrying bolts having plane faces and rounded edges, and pivoted wedges having parallel faces adapted to be thrust between the bolt-heads, substantially as described.

BERNARD NOLAN.

Witnesses:
C. C. LINTHICUM,
O. P. HARFORD.